(12) United States Patent
Kim et al.

(10) Patent No.: US 6,878,856 B2
(45) Date of Patent: Apr. 12, 2005

(54) SYSTEM AND METHOD FOR BIOREMEDIATING WASTESTREAMS CONTAINING ENERGETICS

(75) Inventors: Byung J. Kim, Champaign, IL (US); Neal R. Adrian, Champaign, IL (US); Clint M. Arnett, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 498 days.

(21) Appl. No.: 10/096,659

(22) Filed: Mar. 14, 2002

(65) Prior Publication Data

US 2003/0175942 A1 Sep. 18, 2003

(51) Int. Cl.[7] .............................. A62D 3/00; B01J 10/00; C02F 9/14
(52) U.S. Cl. ........................ 588/319; 422/105; 422/189; 422/198; 422/225; 422/231; 435/262.5; 588/403; 588/405; 588/408; 588/900
(58) Field of Search ................................. 588/900, 319, 588/403, 405, 408, 202, 205; 210/605, 610, 612, 614, 631; 435/262, 262.5; 422/188, 189, 105–116, 198, 225, 231

(56) References Cited

U.S. PATENT DOCUMENTS

| | | | |
|---|---|---|---|
| 4,686,380 A | | 8/1987 | Angott |
| 5,228,996 A | * | 7/1993 | Lansdell ..................... 210/605 |
| 5,269,634 A | * | 12/1993 | Chynoweth et al. ........ 405/303 |
| 5,354,458 A | * | 10/1994 | Wang et al. ................. 210/180 |
| 5,387,271 A | | 2/1995 | Crawford |
| 5,902,744 A | * | 5/1999 | Gray et al. .............. 435/262.5 |
| 5,955,350 A | * | 9/1999 | Soni et al. .................. 435/264 |
| 5,998,199 A | | 12/1999 | Moser |
| 6,017,750 A | * | 1/2000 | Harvey et al. ........... 435/262.5 |
| 6,033,899 A | * | 3/2000 | Moser et al. ............ 435/262.5 |
| 6,051,420 A | | 4/2000 | Radtke et al. |
| 6,060,292 A | * | 5/2000 | Gray et al. .................. 435/170 |
| 6,066,772 A | * | 5/2000 | Hater et al. .................. 588/202 |
| 6,080,906 A | * | 6/2000 | Johnson et al. ............. 588/200 |
| 6,083,738 A | * | 7/2000 | Moser et al. ............ 435/262.5 |
| 6,084,150 A | | 7/2000 | Crawford |
| 6,096,214 A | * | 8/2000 | Ripley ........................ 210/603 |
| 6,117,203 A | * | 9/2000 | Buchhave et al. ............. 71/12 |
| 6,248,580 B1 | * | 6/2001 | Spain et al. ............. 435/262.5 |

(Continued)

FOREIGN PATENT DOCUMENTS

DE 41 41 940 A1 * 6/1993
DE 42 02 132 A1 * 7/1993

OTHER PUBLICATIONS

US 5,886,144, 3/1999, Major (withdrawn)*
Derwent Abstract Accession No. 1992–413895 (for SU 1708776 A1).*

(Continued)

*Primary Examiner*—Stanley S. Silverman
*Assistant Examiner*—Ardith E Hertzog
(74) *Attorney, Agent, or Firm*—Earl H. Baugher, Jr.

(57) ABSTRACT

A bioremediation system converts a waste stream, at least part of which is a fluid containing energetics, to carbon dioxide ($CO_2$), water, and environmentally benign end products. It uses gas-enhanced sequencing-batch-reactors (SBRs), treating the waste stream in three SBRs seriatim. The first SBR uses a nitrogen purge, the second a hydrogen gas supplement, and the third an oxygen gas or forced air supplement. Each reactor may be supplemented with additives to optimize conditions such as pH, dissolved oxygen, and nutrient level. The system may be implemented under manual control, semi-automated, or fully automated, as needed. A waste stream of consideration is the pink water resultant from munitions fabrication and handling.

31 Claims, 1 Drawing Sheet

U.S. PATENT DOCUMENTS

| | | | |
|---|---|---|---|
| 6,334,954 B1 * | 1/2002 | Crawford et al. | 210/610 |
| 6,348,639 B1 * | 2/2002 | Crawford et al. | 588/244 |
| 6,383,371 B1 * | 5/2002 | Ripley | 210/120 |
| 2001/0045390 A1 * | 11/2001 | Kim et al. | 210/605 |
| 2002/0117444 A1 * | 8/2002 | Mikkelson et al. | 210/605 |

OTHER PUBLICATIONS

Preuss et al., "Anaerobic transformation of 2,4 6–trinitrotolune (TNT)", Arch. Microbiol., 1993, vol. 159, pp. 345–353.*

Abstract Q–383 in "Abstracts of the 94th General Meeting of the American Society for Microbiology", 1994.*

Roberts et al., "Optimization of an Aerobic Polishing Stage To Complete the Anaerobic Treatment of Munitions–Contaminated Soils", Environ. Sci. Technol., 1996, vol. 30, pp. 2021–2026.*

Mouche, "Changing the Army's 'Color Guard'", Pollution Engineering, Dec. 1996, vol. 28, Iss. 13, p. 30 (4 pp.).*

Vanderloop et al., "Biotransformation of 2,4–Dinitrotoluene Under Different Electron Acceptor Conditions", Wat. Res., 1999, vol. 33, No. 5, pp. 1287–1295.*

* cited by examiner

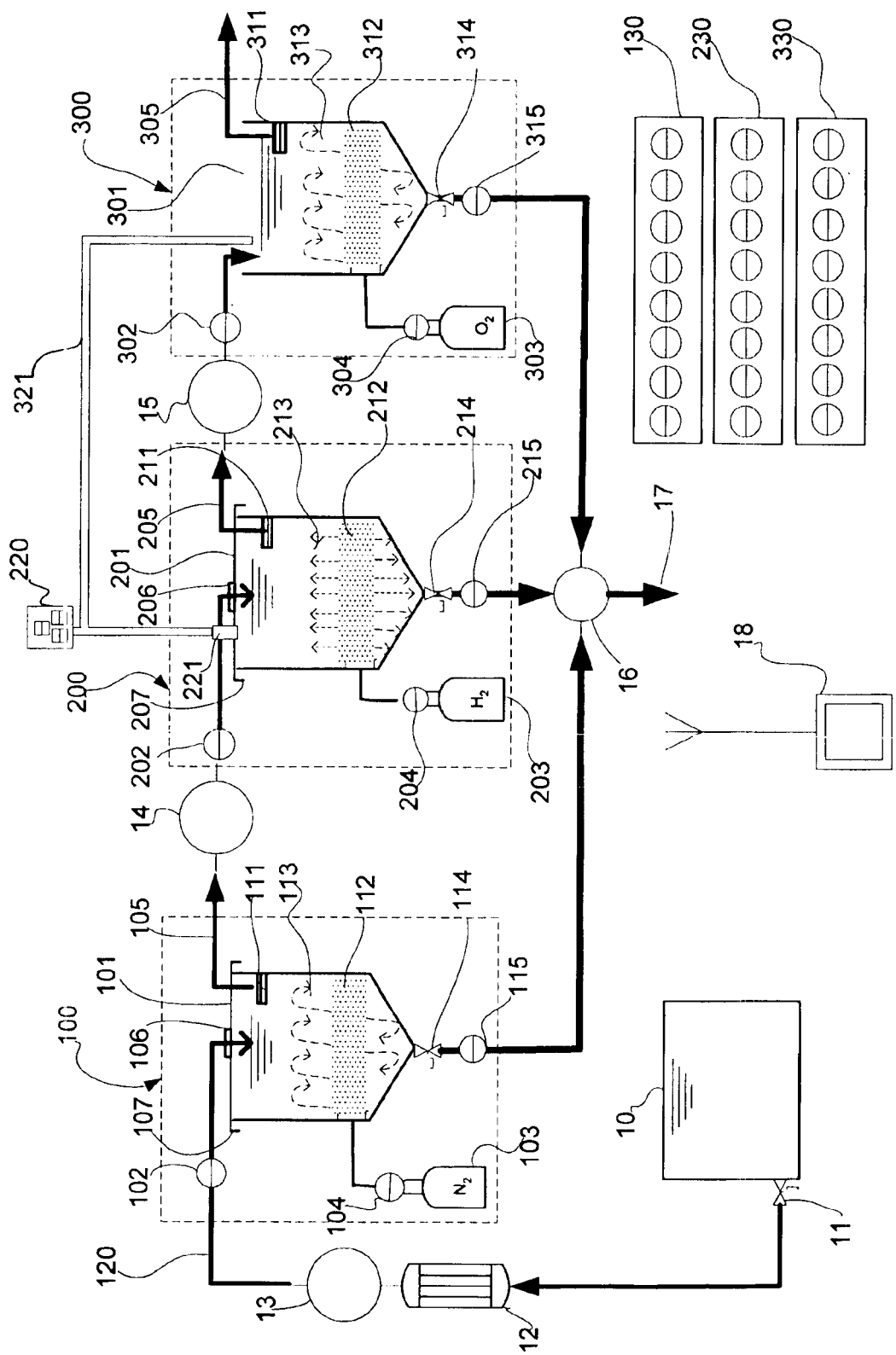

SYSTEM AND METHOD FOR BIOREMEDIATING WASTESTREAMS CONTAINING ENERGETICS

STATEMENT OF GOVERNMENT INTEREST

The invention described herein may be manufactured and used by or for the Government of the United States of America for governmental purposes without the payment of any royalties thereon or therefor.

FIELD OF THE INVENTION

Provided is a system and method for treating a waste stream, in particular treating a system applying a relatively rapid multi-step bioremediation process to a waste stream containing energetics.

BACKGROUND

Pink water is wastewater generated from the load-assemble-pack (LAP) operations at U. S. Army Ammunition Plants (AAPs). Constituents of pink water include 2,4,6 trinitrotoluene (TNT), trimethylenetrinitramine (RDX) and cyclotetramethylenetetramine (HMX). Carbon sorption is the conventional method for treating this LAP waste. Using granulated activated carbon (GAC) filters, the waste is passed through the GAC removing the explosive constituents by sorption onto the carbon. This method is non-destructive, i.e., the sorbed molecules of contaminant remain intact chemically. Thus, the process generates spent contaminant-laden GAC filters that require further treatment, to include regeneration of the carbon filter for re-use or safe disposal at the end of the filter's useful life. The U. S. military and its contractors generate a substantial amount of spent GAC from pink water treatment and would save considerable resources by replacing the GAC filtration process with a process that actually destroys or neutralizes energetic contaminants. An alternative to GAC is microbial treatment.

Because TNT has a high electron deficiency, any initial microbial transformation is reductive. Vorbeck, C., et al., *Initial Reductive Reactions in Aerobic Microbial Metabolism of 2,4,6-Trinitrotoluene*, Appl. Environ. Microbiol. 64, 246–252, 1998. Treating TNT waste streams under aerobic conditions produces a variety of partially reduced TNT daughter products. Vorbeck et al. 1998; Pasti-Grigsby, et al., *Transformation of 2,4,6-trinitrotoluene (TNT) by Actinomycetes Isolated from TNT- Contaminated and Uncontaminated Environments*, Appl. Environ. Microbiol. 62, 1140–1123, 1996; Fiorella, P. D. and Spain, J. C., *Transformation of 2,4,6-Trinitrotoluene by Pseudomonas pseudoalcaligenes JS52*, Appl. Environ. Microbiol. 63, 2007–2015, 1997. These daughter products converge TNT to aminodinitrotoluenes, diaminonitrotoluenes, tetranitroazoxytoluenes and combinations thereof. Roberts, D. J., et al., *Optimization of an Aerobic Polishing Stage to Complete the Anaerobic Treatment of Munitions-Contaminated Soils*, Environ. Sci. Technol. 30, 2021–2026, 1996. Under aerobic conditions, these metabolites are resistant to further degradation and are therefore considered dead-end products. Vorbeck et al., 1998. Anaerobic conditions are required for the complete reduction of TNT to triaminotoluene (TAT). Funk, S. B., et al, *Initial-phase Optimization for Bioremediation of Munition Compound-Contaminated Soils*, Appl. Environ. Microbiol. 59, 2171–2177, 1993; Boopathy, R. and Kulpa, C. F., *Trinitrotoluene (TNT) as a Sole Nitrogen Source for a Sulfate Reducing Bacterium Desulfovibrio sp. (B Strain) Isolated from an Anaerobic Digester*, Current Microbiol., 25:235–241, 1992; McCormick, N. G., et al., *Microbial Transformation of 2,4,6-Trinitrotoluene and Other Nitroaromatic Compounds*, Appl. Environ. Microbiol. 31, 949–958, 1976; Preuss, A., et al., *Anaerobic Transformation of 2,4,6-trinitrotoluene (TNT)*, Arch. Microbiol. 159, 345–353, 1993; Hwang, P., et al., *Transformation of TNT to Triaminotoluene by Mixed Cultures Incubated under Methanogenic Conditions*, Environ. Toxic. Chem. 19, 836–841, 2000. The fate of TAT is largely unknown, although phenolic products of TAT hydrolysis and an adduct of TAT have been identified, apparently formed by the condensation of TAT and pyruvic aldehyde. Lewis et al., 1996; Lewis, T. A., et al., *Products of Anaerobic 2,4,6-Trinitrotoluene (TNT) Transformation by Clostridium bifermentans*, Appl. Environ. Microbiol. 62, 4669–4674, 1996.

RDX is reported to be more easily biodegraded under anaerobic, rather than aerobic conditions. Funk et al., 1993; Kitts, C. L. et al., *Isolation of Three Hexahydro-1,3,5-Trinitro-1,3,5-Triazine-Degrading Species from the Family Entrobacteriaceae from Nitramine Explosive-Contaminated Soil*, Appl. Environ. Microbiol., 60:4608–4711, 1994; McCormick, N. G., et al., *Biodegradation of hexahydro-1,3,5-trinitro-1,3,5-triazine*, Appl. Environ. Microbiol. 42, 817–823, 1981; Roberts et al., 1996. One of the few exceptions includes RDX biodegradation by a white rot fungus. Fernando and Aust, *Biodegradation of Munition Waste, TNT (2,4,6-trinitrotoluene), and RDX (hexahydro-1,3,5-trinitro-1,3,5-Triazine) by Phanerochaete chrysosporium*, Emerging Technologies in Hazardous Waste Management II, ACS Symposium Series, 468, 214–232, 1991. Another exception is degradation by the bacterium *Stenotrophomonas maltophilia* PB1 when using RDX as the sole source of nitrogen. Binks, P. R., et al., *Degradation of hexahydro-1,3,5-trinitro-1,3,5-triazine (RDX) by Stenotrophomonas maltophilia PB1*, Appl. Environ. Microbiol., 61, pp 1318–1322, 1995. A third exception occurs during composting of explosives-contaminated soil. Williams, R. T., et al., *Composting of Explosives and Propellant Contaminated Soils Under Thermophilic and Mesophilic Conditions*, J. Indus. Microbiol., 9, 137–144, 1992.

Most of the studies demonstrating RDX biodegradation under anaerobic conditions were conducted under poorly defined conditions where the electron donor and acceptors were not firmly established. For example, the bacterial cultures were grown in nutrient broth. McCormick et al., 1981. They were also grown in yeast extract. Kitts et al., 1994. A third example involves growth in Brain Hear Infusion media. Regan, K. M., and R. L. Crawford, *Characterization of Clostridium bifermentans and its Biotransformation of 2,4,6-trinitrotoluene (TNT) and 1,3,5-triaza-1,3,5-trinitrocyclohexane (RDX)*, Biotechnology Letters, 16, 1081–1086, 1994. In the latter two cases, RDX biodegradation was carried out by pure cultures of bacteria isolated from explosives-contaminated soil. In the former case, the nutrient broth was inoculated with organisms from activated sludge.

Anaerobic conditions are required for complete explosives degradation, but little is known about the bacteria carrying out the transformation or the environmental conditions that would further enhance the degradation activity. A preferred embodiment of this invention was motivated by the explosives biodegradation research results at the U.S. Army Engineer Research & Development Center (ERDC), Construction Engineering Research Laboratory (CERL). Adrian, N. R., and Lowder, A., *Biodegradation of RDX and HMX by a Methanogenic Enrichment Culture*, P 1–6, in B. C. Alleman (ed.) *Bioremediation of Nitroaromatic and*

Haloaromatic Compounds, Battelle Press, Ohio, 1999; Adrian, N. R. and Sutherland, K., RDX Biodegradation by a Methanogenic Enrichment Culture Obtained from an Explosives Manufacturing Wastewater Treatment Plant, US Army CERL Technical Report 99/15, ADA 360452, 1998; Adrian, N. R. and Sutherland, K., Biodegradation of RDX by a Methanogenic Enrichment Culture Obtained from an Explosive Manufacturing Wastewater Treatment Plant, Abst. Ann. Meet. Am. Soc. Microbiology, Q-359, Miami, Fla., 1997. The authors investigated biodegradation of energetic compounds under anaerobic conditions using ethanol as the sole electron donor. They found that the inhibition of the methanogens did not affect the degradation of RDX and did not even appear to be involved in the degradation of RDX. Adrian and Sutherland, 1998. Adding RDX to the mixed culture did, however, inhibit methane generation. Adrian and Lowder, 1999. That same year experiments demonstrated the use of $H_2$ and the involvement of acetogenic bacteria in carrying out explosives degradation. Further evidence indicates that the acetogens are the major metabolic group in the mixed culture that degrades TNT, RDX, and HMX. Arnett, C. and Adrian, N. R., Isolation of a RDX-Degrading Acetogenic Bacterium from a Methanogenic Culture that Degrades RDX, HMX, and TNT, Second Int. Sym. Biodegradation of Nitroaromatic Compounds and Explosives, Leesburg, Va., 1999.

In a parallel effort to the above microbiological research, the ERDC/CERL conducted engineering evaluation of treatment of energetic compounds using biotechnology. A granular activated carbon fluidized bed reactor (GAC-FBR) was demonstrated to biologically degrade energetic compounds under anaerobic conditions at bench and pilot scales. Berchtold, S. R., et al., Treatment of 2,4-Dinitrotoluene Using a Two Stage System: Fluidized-Bed Anaerobic GAC Reactors and Aerobic Activated Sludge Reactors, Water Env. Res., 67, 1081–1091, 1995; Maloney, S. W., et al., Anaerobic Fluidized Bed Treatment of Propellant Wastewater, Water Env. Res., 70, n1, p.52, 1998. These investigations confirmed other work that found that, based on mass balance, end products from TNT degradation included nitrate and biomass in the effluent. VanderLoop, S. L., et al., Biotransformation Of 2,4-Dinitrotoluene under Different Electron Acceptor Conditions, Water Research, 33, n5, p. 1287, 1999; VanderLoop, S. L., et al., Two-Stage Biotransformation of 2,4,6-trinitrotoluene under Nitrogen-Rich and Nitrogen-Limiting Conditions, Water Env. Res., 70, n2, p. 189, 1998. Successful GAC-FBR treatment of TNT was demonstrated at McAlester AAP, Oklahoma. Maloney, S. W., et al., Anaerobic Treatment of Pink water in a Fluidized Bed Reactor Containing GAC, Journal of the American Institute of Chemical Engineers, accepted for publication, 2001.

Certain U.S. patents relate to bioremediation of explosive contaminated soils and groundwater. U.S. Pat. No. 6,066,772, Treatment of TNT-contaminated soil to Hater et al., May 23, 2000 and U.S. Pat. No. 5,998,199, Compost Decontamination of Soil Contaminated with TNT, HMX and RDX with Aerobic and Anaerobic Microorgdnisms, to Moser and Gray, Dec. 7, 1999, use natural organisms to degrade the explosives contaminated soil in anaerobic compost following aerobic compost processes. To achieve an anaerobic condition, at least one oxidizable carbon source is added.

U.S. Pat. No. 5,387,271, Feb. 7, 1995; U.S. Pat. No. 5,616,162, Apr. 1, 1997; and U.S. Pat. No. 6,084,150, Jul. 4, 2000, each issued to Crawford et al., and each entitled Biological System for Degrading Nitroaromatics in Water and Soils, use two-step anaerobic treatment to decontaminate soil and water containing nitroaromatics. The first step is fermentation of a carbohydrate such as starch by facultative microorganisms, thus exhausting oxygen and insuring anaerobic conditions. The second step uses anaerobic microorganisms to destroy energetic compounds, while using a carbohydrate for the carbon and energy source.

U.S. Pat. No. 6,051,420, Method for the Decontamination of Soil Organic Explosives, to Radtke and Roberto, May 20, 1998, describes a method for decontaminating soil in situ by first providing an organic solvent to dissolve chunks of explosives, thus facilitating bioremediation of the smaller particles by bacteria while further being aided by the addition of an organic nutrient to the treated soil.

Each of these methods involves adding a carbon source and multiple stages that may require extensive time to complete. A need for a treatment plan that does not require the addition of an expensive carbon source nor require an extended treatment period is met by a preferred embodiment of this invention.

SUMMARY

In a preferred embodiment, an advanced bioremediation system converts a waste stream, at least part of which is a fluid containing energetics, to carbon dioxide ($CO_2$), water, and environmentally benign end products. It uses gas-enhanced sequencing-batch-reactors (SBRs), treating the waste stream in three SBRs seriatim. The first SBR uses a nitrogen purge, the second a hydrogen gas supplement, and the third an oxygen gas or forced air supplement. A waste stream of consideration is the pink water resultant from munitions fabrication and handling.

In the first batch reactor the waste is allowed to settle, providing a sludge that is periodically drawn from the bottom of the reactor. Simultaneously the reactor de-oxygenates the waster by introducing nitrogen gas through a disperser such as a bubbler diffuser. This yields a first treated fluid output that is amenable to anaerobic bioremediation in a second batch reactor. The fluid from the first batch reactor is pumped from a floating decanter to the second batch reactor.

The second batch reactor employs anaerobic microorganisms whose activity is enhanced by bubble diffusing hydrogen gas therein. The benefit of using hydrogen gas in a reactor is detailed in the report of Neal R. Adrian, The Importance Of Hydrogen in the Anaerobic Degradation of Explosives, A Research Note Submitted to Byung Kim in Support of a Patent Application for Reactor System Using $H_2$ Gas as the Cosubstrate to Support Explosives Degradation, ERDC, Champaign, Ill., Apr. 19, 2000, and incorporated herein by reference. The anaerobic microorganisms may be suspended in the liquid or disposed on a sludge or a biofilm of a carrier. If the microorganisms are disposed on sludge, a paddle stirrer may be employed to insure proper dispersal of the microorganisms. After a sufficient processing time in the second batch reactor, nominally two hours, the treated fluid is pumped to a third batch reactor. To minimize the transfer of solids, the second reactor may also use a floating decanter.

The third batch reactor employs aerobic microorganisms whose activity is enhanced by bubble diffusing a gas having at least some oxygen. For example, either an oxygen bottle or a simple air compressor line may provide the input to the bubble diffuser. The fluid from the final reactor is drawn off, perhaps using a floating decanter, and re-used in processing.

The sludge that accumulates within each reactor is pumped out periodically as accumulation warrants. Each of the batch reactors may incorporate a valve for accessing sludge therein and the valve may be powered to permit automated or semi-automated control of this function.

Conventionally, pink water is generated as a hot waste. Thus, the system may require the use of a subsystem for maintaining a pre-specified temperature, such as a heat exchanger to cool the waste stream prior to pumping it to any of the reactors, in particular, a reactor containing microorganisms. Further, depending upon the ambient conditions in the area around the reactors, the reactors may require supplemental heating to maintain an optimum 25–30° C. temperature for the microorganisms over the period of time required to bioremediate the pink water.

In addition to optimizing the temperature in each reactor, one or more of the batch reactors may require additives to maintain the pH, provide necessary nutrients or carbon sources, and establish the required dissolved oxygen levels, typically less than about 0.1 mg/l. For example, $CO_2$ gas may be added to the second batch reactor to provide air flow and buffering capacity. The list of required additives may include: nitrogen gas, hydrogen gas, carbon dioxide gas, oxygen gas, forced ambient air, organic carbon, carbon compounds, nutrients, micronutrients, acids, bases, flocculating agents (flocculents), anaerobic microorganisms, aerobic microorganisms, and combinations thereof.

Ideally, the first and second batch reactors are enclosed, i.e., each incorporate a top having a breather, while the final reactor may be open depending on the requirements for maintaining purity of the final effluent or reducing evaporation.

To facilitate control of the process, whether automated, semi-automated or manual, a series of sensors are desirable. Each reactor may need temperature sensors or thermometers, pH sensors, dissolved oxygen (DO) sensors, pressure sensors, fluid level sensors, turbidity meter, electrolytic sensors, flow sensors, or combinations thereof. Information from the sensors should be provided to a display for an operator to monitor as well as to any controller or microprocessor involved in semi-automated or automated control of the process. This display could be a panel of analog or digital meters or a cathode ray tube (CRT) that is able to provide information based on a simple query.

Depending on the size of the reactors, a single pump with a piping and valve system could handle the entire operation on the "fluid" system of the operation while a similar pump, properly set up with the reactors, could handle the sludge pumping. Of course, each reactor could also use its own pump for each of the operations (fluid pumping and sludge pumping), thus reducing the length of the head for any one pumping operation.

The microorganisms within the second and third batch reactors may be of a suspended growth type on a fixed film or suspended in the liquid. In the fixed film type, biofilms reside on small media, i.e., millimeter size, activated carbon, or combinations thereof. Thus, the microorganisms may be located on a biofilm resident upon a small element of less than about 10 mm in its longest dimension, a thin porous contactor of approximately 5 mm diameter and 1–2 mm thickness, a biofilm resident on activated carbon, and combinations thereof. In addition, some microorganisms may be present in sludge. Also provided is a method for treating wastes containing energetics.

In summary, a method for treating a waste having a fluid component entraining energetics comprises monitoring and adjusting conditions to optimize conditions within the system while:

de-oxygenating the waste to a pre-specified level in a first batch reactor via dispersion of nitrogen gas therein;

transferring most of the de-oxygenated fluid portion from the first batch reactor to a second batch reactor;

exposing this transferred fluid to anaerobic microorganisms whose activity is enhanced by dispersion of hydrogen gas within the second batch reactor such that the anaerobic microorganisms decompose most, if not all of the energetics therein;

transferring this anaerobically treated fluid portion to a third batch reactor;

exposing the transferred anaerobically treated fluid to aerobic microorganisms whose activity is enhanced by dispersion of compressed air or bottled oxygen, thus polishing the anaerobically-treated fluid;

transferring the polished fluid from the third batch reactor to be made available for reuse;

collecting the resultant sludge, if any, from each of the batch reactors, as required; and safely disposing of the sludge or recycling it.

Advantages of the system and method include:

ease of integration into existing facilities;

ease of operation, control, and maintenance, including the process control of flow rate and concentration of hydrogen;

ease of automation using programmable logic controllers;

flexible operation, including its control over hydraulic retention time;

low construction cost;

low operation and maintenance costs;

relatively short treatment cycle compared to other bioremediation methods;

low biological oxygen demand (BOD) of final effluent; and minimal carbon sources required.

BRIEF DESCRIPTION OF DRAWING

The FIGURE depicts the process diagram for a preferred embodiment of the invention.

DETAILED DESCRIPTION

Refer to the FIGURE. Three batch-processing, or SBR, systems 100, 200, 300 are operated in series to breakdown energetics in a waste stream and provide re-cycled water and benign solid waste. A source 10 of waste, such as a holding tank for pink water, provides the waste stream. The waste stream may be released on a pre-specified schedule via a power-actuated control valve 11 in a source tank 10 or other carrier such as a direct pipeline from a processing system. The waste stream may be provided to the first SBR system 100 by a pump 13. The entire treatment process may be controlled by a central controller 18 consisting of one or more microprocessors and necessary communications paths to the various components of the treatment system. This controller 18 may communicate via hardwires, fiber optics, hydraulics, pneumatics, or may use any of a number of wireless technologies such as RE or infrared, or combinations thereof, thus enabling flexibility in upgrading control devices as technology improves.

The functions of the first SBR system 100 are flow equalization, sedimentation, supplemental heat exchange, and de-oxygenation. For example, LAP operations intermittently generate hot pink water waste streams. For this reason it is sometimes beneficial to include a subsystem for maintaining a pre-specified temperature, such as a heat exchanger 12 in the front end of the treatment system. Initial flow rate along the input path 120 to the first SBR system 100 is measured by a flow meter 102 that may also be displayed on an operator's panel 130 in the first SBR system 100 and from correlating this measure with the time of operation of the pump 13, the flow volume is derived.

The enclosed first SBR tank 101 assists in stabilizing the waste stream, containing it until the volume reaches a pre-specified amount and the target temperature range is met, e.g., 25–30° C. for bioremediation of pink water. The tank 101 is enclosed by a suitable cover 107 that is penetrated to provide entrance and exit of the waste stream and for venting through a breather 106. To facilitate cooling, the SBR tank 101 has an open breather 106 that may be integral with the input path 120. As well, the surface of the SBR tank 101, perhaps constructed of a heat conducting material such as stainless steel, provides additional cooling. Any suspended or colloidal solids in the waste stream are allowed to settle in the cone shaped bottom of the SBR 101 for a suitable period, nominally a minimum of 2 hours. Solids are removed as sludge via a pump 16 through activation of a valve 114 at pre-specified intervals, or as necessary to optimize the operation of the SBR tank 101. This process is also monitored via a meter 115 that may also be displayed on an operator's panel 130 to insure optimal timing and conditions for operation of the pump 16. Subsequently, the breather 106 is closed and nitrogen purging starts by opening a valve (not separately shown) on a nitrogen bottle 103 having a meter 104 in a line to the SBR tank 101. The meter 104 may also be displayed on an operator's panel 130. To de-oxygenate the waste stream, nitrogen flows through a tubular bubble diffuser 112 that establishes a turbulent flow regime 113 in the SBR tank 101. The breather 106, in addition to its cooling function, also allows the mixture of nitrogen and released oxygen gasses to escape when the internal tank pressure as indicated by a sensor (not separately shown) increases above a pre-specified amount as displayed by an internal pressure meter shown as one of a collection of meters on an operator's panel 130. Suitable communication may be established with an internal pressure sensor, the nitrogen gas pressure sensor 104, a tank thermometer (not separately shown), a water level sensor (not separately shown), a pH sensor (not separately shown), and a dissolved oxygen (DO) sensor (not separately shown). Typically DO is maintained at less than about 0.1 mg/l. Each not separately shown sensor may communicate with a related meter represented in the figure as one of a collection of meters on an operator's panel 130 that enables automated process control. Preferably, each sensor associated with an SBR system 100, 200, 300 is displayed via a series of meters on an operator's panel 130, 230, 330.

When de-oxygenation is complete, i.e., when the DO is typically $\leq$0.1 mg/l, the liquid portion of the de-oxygenated waste stream is collected through a floating decanter 111 and transferred via a pump 14 from the outlet 105 of the first SBR tank 101 to a second SBR system 200.

The second SBR system 200 uses a hydrogen-gas-enhanced biological SBR tank 201 specially designed for biological breakdown of energetic compounds. The de-oxygenated waste stream is transferred by a pump 14 through a meter 202 to the tank's inlet that may be colocated with a breather 206 to the enclosed SBR tank 201, wherein the waste stream is broken down by acclimated anaerobic microorganisms (not separately shown). This SBR tank 201 is also fitted with a top 207 that is penetrated to facilitate the entrance and exit of the waste stream as well as a vent in the form of a breather 206. The microorganisms may inhabit suspended growth (not separately shown) or be resident upon a biofilm (not separately shown) affixed on activated carbon or other carrier. The carrier has a nominal density of about 1.0 g/cc, a porous structure, a surface capable of good attachment, and small size (<5 mm diameter). While the de-oxygenated waste stream fills the reactor tank 201 to a pre-specified level, hydrogen gas ($H_2$) is injected by opening the valve (not separately shown) of the hydrogen gas bottle 203. Status available by monitoring a meter 204 allows the hydrogen flow to be monitored via an appropriate one of a series of meters on an operator's panel 230 to facilitate process control. As in the first SBR tank 101, the hydrogen gas may enter the second SBR tank 201 via a tubular bubble diffuser 212. Optionally, a mixture of hydrogen gas and carbon dioxide ($CO_2$) (source not separately shown) is provided through the diffuser 212. The $CO_2$ may be needed to facilitate the growth of suspended biomass at the level of agitation 213 provided by the diffuser 212. A breather 206 allows $H_2$ (and $CO_2$ if present) to escape when headspace pressure, as determined by a gas pressure sensor (not separately shown) internal to the SBR tank 201, is above a pre-specified value, nominally 6–10 psi. The internal gas pressure sensor, a water level sensor (not separately shown), and pH sensor (not separately shown) may be used in the SBR tank 201 to facilitate process control. Each not separately shown sensor may be in communication with a meter represented in the figure as one of a collection of meters on an operator's panel 230 that may enable semi-automated or automated process control.

Hydrogen concentrations in the liquid waste stream and in the headspace above it in the SBR tank 201 are maintained at pre-specified levels. Nominal values of $H_2$ for treating pink water are 440–4600 ppmv in the waste stream and $10^{5-2\times10^5}$ ppmv in the headspace. The pH is also maintained within a pre-specified range, typically 6.0–7.2 for pink water. Bicarbonate, nutrients, micronutrients, or other carbon sources, and appropriate chemicals for pH control, as necessary, may be added from an off line source 220 through a separate inlet 221. Although a 12-hour hydraulic retention time (HRT) is sufficient to break down TNT and RDX, a 16-hour HRT may be used to coincide with an operator's work schedule, if necessary. For example, a first shift operator initiates the process at the end of a shift and terminates it 16 hours later upon the beginning of the shift the next morning.

Optionally, a slow paddle mixer (not separately shown) may be used in the second SBR tank 201 for mixing the sludge with the pink water to enable an efficient reaction. When the required anaerobic treatment within the second SBR 201 is complete, the liquid is settled for a pre-specified period, nominally about two hours for a pink water waste stream, collected through a floating decanter 211, and transferred by a pump 15 through a pipe 205 to a third SBR system 300 into which it is metered by meter 302. Should excess sludge accumulate in the second SBR tank 201, a power activated valve 214 and meter 215 are provided for sludge disposal with activation via the valve 214 and the sludge pump 16. Optionally, the second SBR tank 201 may be fitted with a heater (not separately shown) to maintain the optimum temperature for the anaerobic microorganisms to work.

The third SBR system 300 aerobically polishes the anaerobically treated liquid from the second SBR system 200. In the third SBR tank 301, aerobically mixed culture microorganisms (not separately shown) in suspended growth convert the product generated in the second SBR tank 201 into $CO_2$, water, and environmentally benign final products. While the product from the second SBR tank 201 fills the third SBR tank 301 from the outlet pipe 205, oxygen gas ($O_2$) or air is injected into the third SBR tank 201 by opening the valve (not separately shown) of the oxygen bottle 303 and metering the $O_2$ through a meter 304, or by blowing air through a conduit (not separately shown) to a tubular bubble diffuser 312 in the third SBR tank 301. The oxygen or air thus introduced maintains suspended growth of the aerobic biomass at the level of agitation 313 provided by the diffuser 312. This third SBR tank 301 is different from the first two in that it may be open to the atmosphere. The third SBR tank 301 may also be enclosed to prevent accumulation of dust or insects or to retard evaporation, however, it need not be enclosed to ensure proper operation. A thermometer (not separately shown), a water level sensor (not separately shown), a DO sensor (not separately shown), and a pH sensor (not separately shown), are used to facilitate process control. Each not separately shown sensor may be associated with a meter represented in figure as one of a collection of meters on an operator's panel 330 that may enable semi-automated or automated process control. Bicarbonate, nutrients, micronutrients, or other carbon sources, and appropriate chemicals for pH control, as necessary, may be added from an offline source 220 through a separate inlet 321. For example, it may be desirable to have a pH in the range of 6.5–7.5 for any treated water that is to be re-cycled. Further, to hasten the settling process within each reactor it may be appropriate to add a flocculent such as one available from a swimming pool supply outlet and marketed as a "clarifier." Optionally, the third SBR tank 301 may be fitted with a heater (not separately shown) to maintain the optimum temperature for the aerobic microorganisms to work.

When the required aerobic treatment is complete and suspended solid concentrations are higher than 2,000 ppm in the third SBR tank 301, the fluid is settled for about two hours, aqueous fluid collected through a floating decanter 311, and pumped through the outlet 305 for recycling. Sludge is removed as necessary. Generation of a large volume of sludge is not expected. However, a power activated valve 314 and meter 315 are provided for sludge disposal with activation via the valve 314 and sludge pump 16. All sludge is transferred at a pump outlet 17 for disposal or recycling.

In comparison with existing activated carbon adsorption methods, a preferred embodiment of this invention generates much less sludge. Further, as compared to a GAC-FBR, it provides hydrogen directly to microorganisms and does not require a significant carbon source such as ethanol.

Other embodiments of the present invention include a facility for processing products containing energetics at which facility a waste that has a fluid component and contains energetics is created, the fluid component treated for safe disposal by any of the embodiments specifically described above. Further embodiments involve treatment processes encompassing the use of $H_2$ enhanced anaerobic fluidized bed bioreactors for treating groundwater or wastewater contaminated with energetics. Anaerobic fluidized bed bioreactors have been shown to be effective for treating pink water using ethanol as the co-substrate. Another embodiment of this invention uses a similarly designed bioreactor, substituting $H_2$ gas for ethanol as the co-substrate to enhance, accelerate, or support the anaerobic biodegradation of energetics. Advantages include less sludge and a product effluent with a low biological oxygen demand (BOD) suitable for discharge to domestic wastewater treatment plants or reintroduction back to groundwater.

In addition to pink water treatment, other applications include systems for: demilitarization wastewater treatment, red water treatment for TNT manufacturing, bioremediation of ground water contaminated with TNT and RDX, and treatment of other biologically recalcitrant pollutants, e.g., chlorinated solvents.

Although specific functions for this system and method have been described, other functions using the described system and method are not excluded from falling within the ambit of the claims herein.

The abstract is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 CFR §1.72(b). Any advantages and benefits described may not apply to all embodiments of the invention.

We claim:

1. A method for treating waste containing energetics, said waste having a fluid component, comprising:
   de-oxygenating said waste to a pre-specified level in a first batch reactor via dispersion of nitrogen gas in said first batch reactor;
   transferring a first fluid portion of said de-oxygenated waste to a second batch reactor;
   exposing said transferred first fluid portion to anaerobic microorganisms whose activity is enhanced by dispersion of hydrogen gas within said second batch reactor, wherein said anaerobic microorganisms decompose at least a portion of said energetics in said transferred first fluid portion;
   transferring a second fluid comprising said fluid remaining after said exposure in said second batch reactor to a third batch reactor;
   exposing said transferred second fluid portion to aerobic microorganisms whose activity is enhanced by dispersion of a gas comprising at least some oxygen, wherein said transferred second fluid portion is polished; and removing a third fluid portion comprising said fluid remaining upon completion of said polishing, wherein said removed third fluid portion may be made available for reuse.

2. The method of claim 1 further comprising dispensing at least one additive to at lest one of said batch reactors.

3. The method of claim 2 in which said at least one additive is selected from the group consisting of: carbon dioxide gas, forced air, organic carbon, carbon compounds, nutrients, micronutrients, acids, bases, flocculating agents, and combinations thereof.

4. The method of claim 3 further comprising dispensing said gasses via at least one bubble diffuser in at least one of said first, second and third batch reactors.

5. The method of claim 3 further comprising suspending said aerobic and anaerobic microorganisms in a liquid.

6. The method of claim 3 further comprising locating said aerobic and anaerobic microorganisms on a carrier, said carrier selected from the group consisting of: sludges, biofilms resident upon media having a greatest dimension of less than 10 mm, biofilms resident upon a thin porous contactor of approximately 5 mm diameter and 1–2 mm thickness, biofilms resident on activated carbon, and combinations thereof.

7. The method of claim 1 further comprising administering processing within at least one of said batch reactors via a controller.

8. The method of claim 7 further comprising inputting information from at least one sensor associated with at least one of said batch reactors to said controller.

9. The method of claim 8 in which said at least one sensor is selected from the group consisting of: temperatures sensors, pH sensors, dissolved oxygen sensors, pressure sensors, fluid level sensor, turbidity meters, electrolytic sensors, flow sensors, and combinations thereof.

10. The method of claim 7 in which said controller is implemented via at least one microprocessor.

11. The method of claim 1 in which said pre-specified level represents a dissolved oxygen (DO) content of less than approximately 0.1 mg/l.

12. The method of claim 1 further comprising settling said waste in at least one of said first, second, and third batch reactors and collecting sludge resultant from said settling.

13. A system for treating waste that has at least a fluid component and contains energetics, comprising:
a first batch reactor that provides at least a first treated fluid output,
wherein at least some solids that may be suspended in said waste settle as sludge, and
wherein said waste is de-oxygenated, said de-oxygenation facilitated by dispensing nitrogen gas within said first batch reactors;
a second batch reactor, operably communicating with said first batch reactor, for treating said first output and providing at least a second treated fluid output,
wherein said second batch reactor employs anaerobic microorganisms whose activity is enhanced by dispersing hydrogen gas within said second batch reactor; and
a third batch reactor in operable communications with said second batch reactor for treating said second fluid output and providing at least a third treated fluid output that may be reused,
wherein said third batch reactor employs aerobic microorganisms whose activity is enhanced by dispersing within said third reactor a gas having at least some oxygen.

14. The system of claim 13 further comprising at least on source of additives, said at least one source of additives operably communicating with at least one of said batch reactors.

15. The system of claim 14 in which said additives are selected from the group consisting of: carbon dioxide gas, forced ambient air, organic carbon, carbon compounds, nutrients, micronutrients, acids, bases, flocculating agents, and combinations thereof.

16. The system of claim 15 in which at least one of said nitrogen, hydrogen, carbon dioxide, and oxygen gasses is distributed within at least one of said batch reactors via at least one bubble diffuser.

17. The system of claim 15 in which said third batch reactor comprises a tank that may be open to the atmosphere, wherein said batch reactor operably communicates with said at least one source of additives, said additives in said source comprising oxygen gas.

18. The system of claim 15 in which said third batch reactor comprises a tank that may be open to the atmosphere, wherein said third batch reactor operably communicates with said at least one source of additives, said additives in said source comprising forced ambient air.

19. The system of claim 15 in which said first and second batch reactors are enclosed,
each incorporating at least one breather,
wherein said first batch reactor operably communicates with said at least one source of additives, said additives in said source comprising nitrogen gas, and
wherein said second batch reactor operably communicates with said at least one source of additives, said additives in said source comprising hydrogen gas.

20. The system of claim 13 in which said batch reactors are each equipped with at least one sensor.

21. The system of claim 20 further comprising at least one controller operably communicating with at least said sensor.

22. The system of claim 21 which said at least one controller incorporates at least one microprocessor.

23. The system of claim 20 in which said at least one sensor is selected from the group consisting of: temperature sensors, pH sensors, dissolved oxygen sensors, pressure sensors, fluid level sensors, turbidity meters, electrolytic sensors, flow sensors, and combinations thereof.

24. The system of claim 20 further comprising at least on least one sensor.

25. The system of claim 13 further comprising a subsystem for maintaining a pre-specified temperature to include at least one heat exchanger in operable communication with said waste stream,
wherein said at least one heat exchanger is positioned to at least partially cool said waste to optimize processing by said anaerobic microorganisms.

26. The system of claim 13 further comprising at least one pump.

27. The system of claim 13 in which said anaerobic and aerobic microorganisms locate on a carrier, said carrier selected from the group consisting of: sludges biofilms resident upon media having a greatest dimension of less than 10 mm, biofilms resident upon a porous contactor of approximately 5 mm diameter and 1–2 mm thickness, biofilms resident on activated carbon, and combinations thereof.

28. The system of claim 13 in which at least one of said batch reactors incorporates a paddle stirrer.

29. The system of claim 13 in which at least one of said batch reactors further comprising a valve for accessing sludge therein.

30. A method of processing material, a consequence of which methods entrains energetics in a waste having a fluid component, said fluid component being treated for safe disposal by:
de-oxygenating said waste to a pre-specified level in a first batch reactor via dispersion of nitrogen gas in said first batch reactor;
transferring a first fluid portion of said de-oxygenated waste to a second batch reactor;
exposing said transferred first fluid portion to anaerobic microorganisms whose activity is enhanced by dispersion of hydrogen gas within said second batch reactor,
wherein said anaerobic microorganisms decompose at least a portion of said energetics in said transferred first fluid portion;
transferring a second fluid portion of said fluid remaining after said exposure in said second batch reactor to a third batch reactor;
exposing said transferred second fluid portion to aerobic microorganisms whose activity is enhanced by dispersion of a gas comprising at least some oxygen;,
wherein said transferred second fluid portion is polished; and
removing a third fluid portion comprising said fluid remaining upon completion of said polishing,
wherein said removed third fluid portion may be made available for reuse.

31. A facility for processing products containing energetics at which facility a waste that has at least a fluid component and contains energetics as created, said fluid component treated for safe disposal by a system comprising:

a first batch reactor that provides at least a first treated fluid output, wherein at least some solids that may be suspended in said waste settle as sludge, and wherein said waste is de-oxygenated, said de-oxygenation facilitated by dispersing nitrogen gas within said first batch reactor;

a second batch reactor, operably communicating with said first batch reactor, for treating said first fluid output and providing at least a second treated fluid output, wherein said second batch reactor employs anaerobic microorganisms whose activity is enhanced by dispersing hydrogen gas within said second batch reactor; and a third batch reactor in operable communication with said second batch reactor for treating said second fluid output and providing at least a third treated fluid output that may be reused, wherein said third batch reactor employs aerobic microorganisms whose activity is enhanced by dispersing within said third reactor a gas having at least some oxygen.

* * * * *

UNITED STATES PATENT AND TRADEMARK OFFICE
CERTIFICATE OF CORRECTION

PATENT NO. : 6,878,856 B2
DATED : April 12, 2005
INVENTOR(S) : Byung J. Kim, Neal R. Adrian and Clint M. Arnett It is certified that error appears in the above-identified patent and that said Letters Patent is hereby corrected as shown below:

Column 6,
Line 61, from "wireless technologies such as RE or infrared, or combina-" to -- wireless technologies such as RF or infrared, or combina- --

Column 8,
Line 36, from "$10^{5-2 \times 105}$ ppmv in the headspace. The pH is also maintained" to -- $10^5 - 2 \times 10^5$ ppmv in the headspace. The pH is also maintained --

Column 9,
Line 21, from "associated with a meter represented in figure as one of a" to -- associated with a meter represented in the figure as one of a --

Column 10,
Line 46, from "least one additive to at lest one of said batch reactors" to -- least one additive to at least one of said batch reactors --
Line 48, from "additive is selected from the group consisting of: carbon" to -- additive is selected from the group consisting of: nitrogen gas, carbon --

Column 11,
Line 25, from "reactors;" to -- reactor; --
Line 32, from "a third batch reactor in operable communications with" to -- a third batch reactor in operable communication with --
Line 39, from "14. The system of claim 13 further comprising at least on" to -- 14. The system of claim 13 further comprising at least one --
Line 44, from "selected from the group consisting of: carbon dioxide gas," to -- selected from the group consisting of: nitrogen gas, carbon dioxide gas --
Line 54, from "wherein said batch reactor operably communicates with said" to -- wherein said third batch reactor operably communicates with said --

Column 12,
Line 8, from "22. The system of claim 21 which said at least one" to -- 22. The system of claim 21 in which said at least one --
Lines 15-16, from "24. The system of claim 20 further comprising at least on least one sensor." to -- 24. The system of claim 20 further comprising at least one display for said at least one sensor. --
Line 20, from "cation with said waste stream," to -- cation with said waste, --
Line 27, from "selected from the group consisting of: sludges biofilms" to -- selected from the group consisting of: sludges, biofilms --

UNITED STATES PATENT AND TRADEMARK OFFICE
CERTIFICATE OF CORRECTION

PATENT NO. : 6,878,856 B2
DATED : April 12, 2005
INVENTOR(S) : Byung J. Kim, Neal R. Adrian and Clint M. Arnett It is certified that error appears in the above-identified patent and that said Letters Patent is hereby corrected as shown below:

Column 12 (cont'd),
Line 36, from "batch reactors further comprising a valve for accessing" to -- batch reactors further comprises a valve for accessing --
Line 39, from "which methods entrains energetics in a waste having a fluid" to -- which method entrains energetics in a waste having a fluid --

Column 13,
Line 1, from "component and contains energetics as created, said fluid" to -- component and contains energetics is created, said fluid --

Signed and Sealed this

Seventeenth Day of May, 2005

JON W. DUDAS
*Director of the United States Patent and Trademark Office*